F. MIHALYI.
OPTICAL INSTRUMENT.
APPLICATION FILED DEC. 18, 1916.

1,267,572.

Patented May 28, 1918.

Inventor:
Frank Mihalyi
by Davis & Simms
his attorneys

UNITED STATES PATENT OFFICE.

FRANK MIHALYI, OF ROCHESTER, NEW YORK, ASSIGNOR TO CROWN OPTICAL COMPANY, OF ROCHESTER, NEW YORK, A CORPORATION.

OPTICAL INSTRUMENT.

1,267,572.    Specification of Letters Patent.    Patented May 28, 1918.

Application filed December 18, 1916. Serial No. 137,553.

*To all whom it may concern:*

Be it known that I, FRANK MIHALYI, a citizen of the United States of America, and resident of Rochester, in the county of Monroe and State of New York, have invented certain new and useful Improvements in Optical Instruments, of which the following is a specification.

The present invention relates to optical instruments, and more particularly to the type which employs prisms such for instance, as binocular telescopes, an object of this invention being to provide a mounting for the prism constructed to permit the ready adjustment of the prism in the direction of its length after the instrument has been assembled. Another object of the invention is to provide a construction which, while permitting the adjustment of the prism, will firmly hold the latter to its seat against displacement by sudden shocks or jars.

To these and other ends, the invention consists of certain parts and combinations of parts all of which will be hereinafter described, the novel features being pointed out in the appended claims.

In the drawings:—

Figure 1:
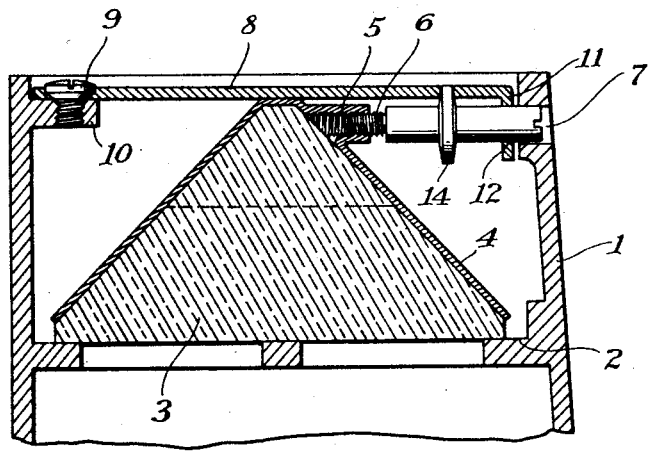
Figure 1 is an enlarged sectional view through a portion of a binocular casing, illustrating the present invention.
Figure 2:
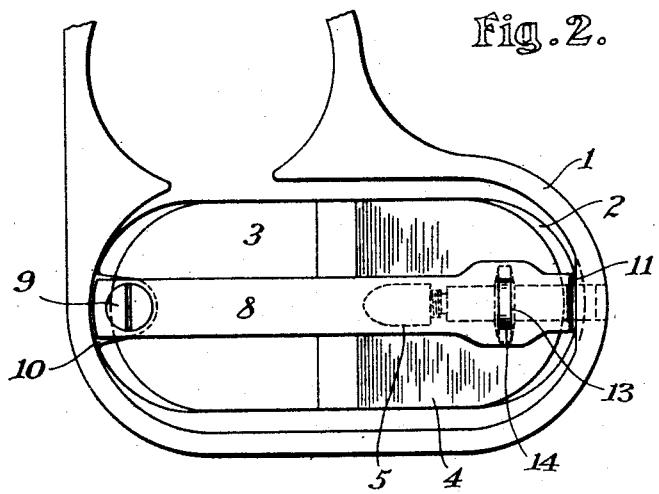
Fig. 2 is an interior view of a binocular casing equipped with this invention.

Referring more particularly to the drawings, 1 indicates a casing of a binocular telescope, said casing having an internal prism seat 2 on which the prism 3 is adjustable longitudinally, the prism in this instance being in the form of a triangle having its hypotenuse resting upon the seat.

Coöperating with two angularly arranged faces of the prism is a device 4 which preferably covers both of the faces, and serves, in this instance, for supporting a screw part 5 preferably in the form of an internally threaded sleeve formed integrally with the part 4 and arranged substantially parallel with the seat 2. Coöperating with this screw part 5 is a screw part 6 preferably lying also parallel with the seat 2 and projected into an opening 7 formed in a side wall of the casing 1, so that said screw part 6 may be operated from the exterior of the casing when the latter is closed by a cover plate (not shown).

Figure 3:
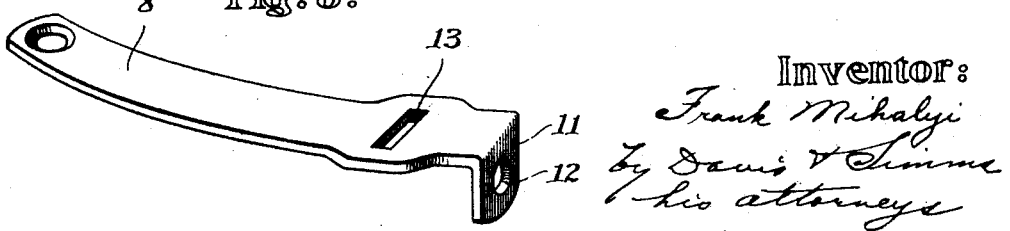
Fig. 3 is a perspective view of the leaf-spring or device which exerts a yielding pressure upon the prism to hold the latter to its seat.

The screw part 6 is preferably held against longitudinal movement, while rotary movement thereof is permitted, and to this end the device which serves to exert pressure on the prism to hold the latter to its seat acts as a support for the screw part 6. This pressure device, shown in detail in Fig. 3, preferably embodies a leaf-spring 8 normally curved, and secured at one end by a screw 9 anchored in an internal lug 10 on the casing 1, said screw preventing any longitudinal movement of the leaf-spring. The other end of the leaf-spring is bent laterally at 11 and has an opening 12 in the laterally turned portion in which the screw part 6 turns. Longitudinal movement of the screw part 6 with reference to the leaf-spring 8 is prevented preferably by providing the leaf-spring with a slot or opening 13 in which an annular rib 14 on the screw part 6 operates, this rib preferably having its side walls converging in order that there will be no lost lateral motion between the annular rib 14 and the pressure device 8. Between its ends the leaf-spring or pressure device 8 coöperates with the prism to hold the latter to its seat, this coöperation being effected by an engagement between the leaf-spring and the device 4 to which the adjusting means 5, 6 is connected.

From the foregoing it will be seen that the pressure device or leaf-spring 8 bears with pressure upon the prism 3 to hold the latter to its seat 2. To effect the adjustment of the prism in a direction longitudinally of the seat 2, the screw part 6 is turned by means of a screw driver engaging the end of the screw part 6 that is exposed through the opening 7. This turning of the screw part 6 effects the movement of the prism 3 in a longitudinal direction without producing any movement in the screw part 6, as the latter is held against such movement by its engagement through the annular rib 14 with the pressure device 8. This invention permits the adjustment of the prism in either of two direction by the operation of a single adjusting device, and without requiring any adjustment of the device which produces pressure upon the prism to hold the latter to its seat.

What I claim as my invention and desire to secure by Letters Patent is:—

1. In an optical instrument, a prism seat, a prism adjustable on the seat, a spring member bearing against the prism and secured to a fixed part, and an adjusting screw mounted on the spring and connected independently of the latter with the prism for moving the prism independently of the spring.

2. In an optical instrument, a prism seat, a prism adjustable on the seat, a leaf spring secured at one end to a fixed part and coöperating between its ends with the prism, and an adjusting screw to which the other end of the spring is anchored connected to the prism independently of the spring to move the prism on its seat relatively of the spring.

3. In an optical instrument, a casing having a prism seat, a prism on said seat, a leaf spring extending longitudinally of the seat, secured against longitudinal movement and coöperating between its ends with the prism, a device bearing against two angularly arranged faces of the prism and two coöperating screw parts for adjusting the prism longitudinally, one of said screw-parts being rigid with said device, and the other of said screw parts being rotatably mounted and held against longitudinal movement.

4. In an optical instrument, a prism seat, a prism adjustable on said seat, a device coöperating with two angularly arranged faces of the prism, two coöperating screw parts, one rigid with the prism, a leaf spring secured at one end, coöperating between its ends with the prism, and having its other end secured to and supporting the other screw part against longitudinal movement while permitting the rotation of said screw part.

FRANK MIHALYI.

Copies of this patent may be obtained for five cents each, by addressing the "Commissioner of Patents, Washington, D. C."